United States Patent [19]

Snook, et al.

[11] 4,346,604
[45] Aug. 31, 1982

[54] ELECTROMAGNETIC FLOW PROBE

[75] Inventors: Richard K. Snook, Houston; Douglas R. Lester, Pasadena, both of Tex.; William C. Childs, deceased, late of Houston, Tex., by Billie W. Childs, executrix

[73] Assignee: Narco Bio-Systems, Inc., Houston, Tex.

[21] Appl. No.: 168,295

[22] Filed: Jul. 14, 1980

[51] Int. Cl.³ .............................................. G01F 1/58
[52] U.S. Cl. ................................ 73/861.12; 73/861.17
[58] Field of Search ............ 73/861.12, 861.13, 861.16, 73/861.17; 128/691; 335/212, 237, 290, 298

[56] References Cited

U.S. PATENT DOCUMENTS

| | | | |
|---|---|---|---|
| 1,081,260 | 12/1913 | Zoelly | 335/290 |
| 2,931,932 | 4/1960 | Haigh et al. | 335/212 X |
| 3,417,356 | 12/1968 | Tschopp | 335/298 |
| 3,418,538 | 12/1968 | Roman | 335/298 X |
| 3,860,895 | 1/1975 | Chow et al. | 335/298 |
| 3,926,049 | 12/1975 | Seebode et al. | 73/861.12 |
| 4,195,515 | 4/1980 | Smoll | 73/861.13 |
| 4,236,410 | 12/1980 | Appel et al. | 73/861.12 |

FOREIGN PATENT DOCUMENTS 2250992  10/1972  Fed. Rep. of Germany ... 73/861.12

*Primary Examiner*—Charles A. Ruehl
*Attorney, Agent, or Firm*—Browning, Bushman, Zamecki & Anderson

[57] ABSTRACT

An electromagnetic flow probe for measuring fluid flow, and featuring interchangeable magnet and electrode lumen structures. A complex electrode lead pattern is incorporated in a lumen unit through which the fluid flow is conducted. The magnet structure is equipped with a magnetic field adjustment capability, and adjustable alignment lugs for receiving the lumen unit.

26 Claims, 13 Drawing Figures

ELECTROMAGNETIC FLOW PROBE

BACKGROUND OF THE INVENTION

1. Field of the Invention

The present invention pertains to measurement of fluid flow. More particularly, the present invention relates to electromagnetic flowmeters of the Faraday effect type. Such apparatus may be used to measure flow of any fluid which is an electrical conductor, or which can be ionized.

2. Description of Prior Art

The concept of employing magnetic induction to measure flow of a conducting fluid is well documented. U.S. Pat. No. 2,149,847 to Kolin discloses basic details of a system for such measurement. Essentially, the fluid flow is constrained to pass along a conduit through a magnetic field, with the conduit oriented at a non-zero angle to the field. A potential gradient is induced across the fluid flow within the magnetic field, proportional to the average fluid velocity, and may be detected through electrodes placed in electrical contact with the flow and disposed on opposite sides of the conduit. Preferably, the magnetic field direction, the direction of fluid flow through the magnetic field, and the alignment of the electrodes are all mutually orthogonal.

Electromagnetic flowmeters find significant application in the medical-biological field. Examples of such application include monitoring blood flow during surgery, and during hemodialysis therapy for patients with chronic renal failure. A variety of flow probes have been designed for such purposes, including catheter probes for insertion within a blood vessel, non-cannulated probes which utilize the blood vessel itself as a conduit, and cannulated probes which include a lumen unit, and measure extracorporeal flow.

Sterilization of that part of the flow probe that contacts the patient may be required. Consequently, it is advantageous to be able to separate the magnet portion of the probe from the electrode structure, and possibly to isolate the former from the need for sterile contact with the patient. The concept of separable magnet and electrode elements is known. U.S. Pat. No. 3,757,773 discloses a catheter probe with a magnet unit that remains external to the blood vessel. Additionally, U.S. Pat. No. 3,659,591 discloses a system wherein electrodes are appropriately placed on the skin of the subject, and a coil, remote from the skin, is used to generate the magnetic field. In Proceedings of the I.R.E. 1959, 1901–1912, H. W. Shirer et al disclosed a separable magnet and lumen type structure. However, it will be appreciated that the location and orientation of the flow conduit, whether a blood vessel or an extracorporeal lumen, as well as placement of the electrodes, relative to the magnetic field affect the potential difference measured for a given flow rate. Thus, to avoid the requirement of calibrating the flow meter for each application, there must be consistency of alignment of the conduit and electrodes relative to the field whenever the probe is reconstructed for a measurement.

Sterilization is a particularly acute problem in the case of extracorporeal probes because the lumen itself must be sterilized. For this reason, a disposable lumen unit, used in conjunction with a non-disposable magnet portion, would yield an economic advantage. The magnet portion may be the more expensive part of the probe, and the cost of sterilization of the lumen could be saved. However, to be as practical as possible, such a probe requires a magnet portion that can be used with a great number of different lumen units without the need for recalibration when lumen units are interchanged. Furthermore, an additional economic advantage could be gained if magnet portions could be made to generate like magnetic fields, so that any lumen unit may be used with any magnet portion without further calibration.

Electromagnetic flowmeters usually employ some form of alternating current signal to generate a magnetic field. This is done to avoid problems associated with d.c. magnetic fields, including the difficulties in amplifying the induced d.c. flow signal, and possible plating of the electrodes. Also, where blood flow is being measured, the resulting d.c. field within the blood can lead to breakdown of the blood constituents. However, an alternating magnetic field causes transformer effects, resulting in a quadrature component signal in the electrodes which may be many times larger than the fluid flow signal. Various measures have been proposed to negate, or at least cope with, the quadrature signal. Some of these are discussed, for example, in U.S. Pat. Nos. 2,808,723; 3,316,762; 3,323,364; 3,329,018; and 3,757,773.

The flow signal is further masked by effects of eddy currents generated in the fluid moving in the magnetic field, with possible attendant polarization of the electrodes, and by capacitive imbalance between the electrode leads. The former problem is also addressed by the aforementioned U.S. Pat. No. 3,329,018.

SUMMARY OF THE INVENTION

The apparatus of the present invention includes a probe for measuring fluid flow. The probe features a magnet structure for selectively producing a magnetic field within an operative gap. A housing, including a passage, or lumen, is selectively positionable relative to the magnet structure so as to conduct the fluid flow along the passage through the operative gap. Electrodes are positioned within the housing, or lumen unit, to detect electric potential difference induced within the operative gap and across the flow through the passage. The electrodes are located to detect potential difference along a line perpendicular to the general direction of fluid flow along the passage, which direction is at an angle, preferably 90°, relative to the magnetic field direction within the operative gap. A ground connection to the flow is also provided generally on a plane perpendicular bisector of the flow induced potential gradient.

A pair of primary leads connect the electrodes to signal processing equipment. A pair of secondary leads parallel the primary leads, and are connected to the same signal processing equipment in a crossover pattern outside of the operative gap. Thus, one secondary lead extends from the vicinity of the first electrode out of the operative gap to communicate with the primary lead from the second electrode. The other secondary lead similarly extends from the vicinity of the second electrode and communicates, beyond the operative gap, with the primary lead from the first electrode. Each of the primary and secondary leads may be continued by appropriate conductors joined to the lead segments located within the housing. The ground connection may also be located within the operative gap, and grounded to the signal processing equipment by a single lead or a pair of parallel leads.

The magnetic field generated within the operative gap may be adjusted as to field shape and field strength. Thus, in one embodiment of the invention, the magnetic core of the magnet used to produce the magnetic field has an adjustment gap, fitted with a selectively positionable magnetic adjustment keeper. The reluctance of the magnetic circuit may be selectively altered by changing the position of the keeper, thereby selectively altering the magnetic flux within the operative gap. An alternative embodiment employs a Hall probe located within the operative gap to detect the field produced therein and to signal the magnetic drive circuit. The latter unit then adjusts accordingly, to increase or decrease the field strength to maintain predetermined values.

The housing and magnet structure are designed to mesh so that the desired position and orientation of the lumen, as well as those of the electrode system, will automatically be effected whenever the housing is so joined to the magnet structure. Lugs are mounted on the magnet structure as alignment agents to receive and hold the housing with lumen and electrodes positioned as described hereinbefore. The lugs are selectively adjustable to insure that the desired orientations are achieved.

The magnetic field adjustment means makes it possible to construct many such magnet structures yielding the same magnetic flux values within their respective operative gaps. Similarly, the adjustable lugs allow a given magnet to receive and hold any of the housings in the same configuration relative to the operative gap, and the magnetic field generated therein. Thus, with a plurality of housings constructed generally uniformly, for example, by molding, the housings may then be used interchangeably with any given magnet structure, and each housing may be used with any magnet structure. Such interchanging of housings and/or magnet structures may be done without additional calibration of the magnetic fields and/or the housing positions since all magnet structures are effectively alike, and all housings are so also. Consequently, the present invention provides an electromagnetic flow probe wherein the lumen unit may be treated as disposable after use, and simply replaced by a like lumen unit for subsequent application of the flow probe. Furthermore, the configuration of the electrodes and the associated leads minimizes capacitive imbalances between the leads and the electromagnet electrical circuit, as well as the quadrature signal components.

DESCRIPTION OF PREFERRED EMBODIMENTS

Figure 1:
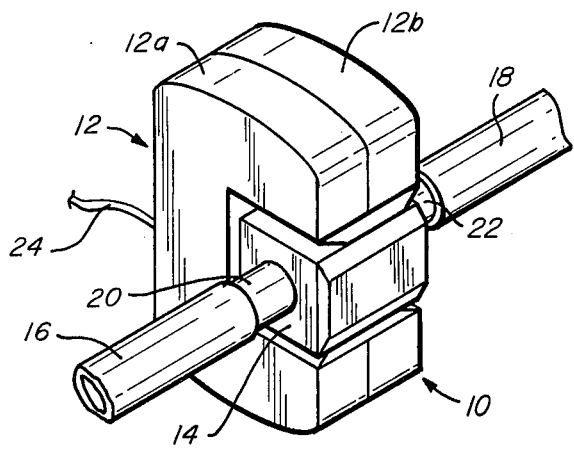
FIG. 1 is a perspective view of the flow probe of the present invention.

The electromagnetic flow probe of the present invention is shown generally at 10 in FIG. 1. A magnet structure (not visible) is contained within a casing 12. A housing, or lumen unit, 14 is in position within an operative gap of the magnet structure. Tubular members 16 and 18 are joined to flow line receptacles 20 and 22 forming parts of the lumen unit 14. Thus, the fluid whose flow is to be monitored passes along the tubular members 16 and 18 through the lumen unit 14, thereby passing through the operative gap of the magnet structure. The casing 12 is shown divisible into two segments 12a and 12b. Elements of the magnet structure and of the electrode lead system are held in place within the casing in any suitable manner. Similarly, the two casing segments 12a and 12b may be held together by clips integrated therein, or adhesive, or any other appropriate means. A shielded cable 24 is shown emerging from the casing 12, and will be discussed in detail hereinafter. The flow probe at 10 may be further clamped in position as needed, or held by any suitable fixture (not shown) joined, for example, to the casing 12.

Figure 2:
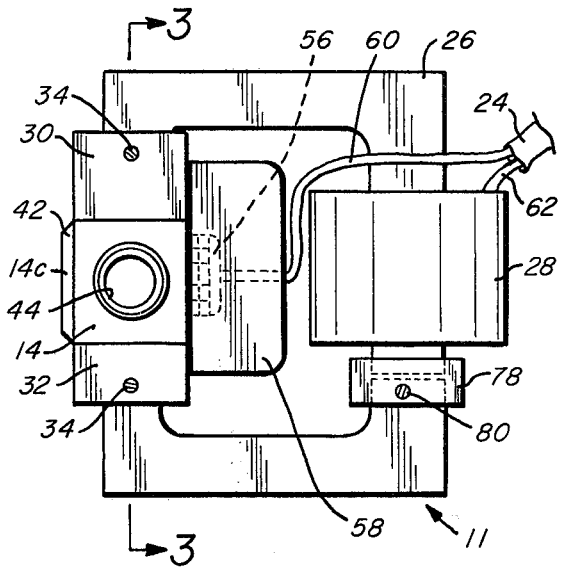
FIG. 2 is a side elevational view of the flow probe with the magnet structure casing removed.
Figure 3:
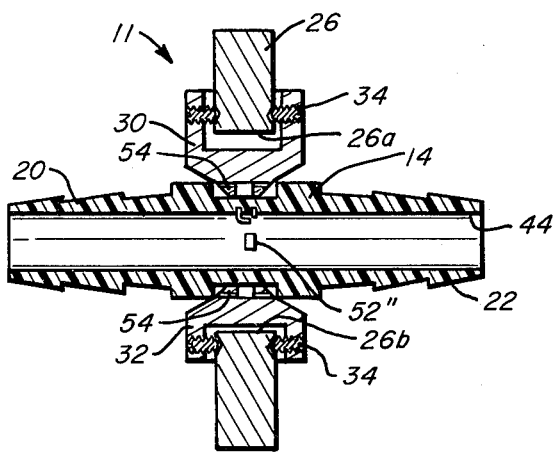
FIG. 3 is a vertical cross section taken along the line 3—3 of FIG. 2.

Details of the magnet structure, indicated generally at 11, may be observed in FIGS. 2 and 3. A generally C-shaped magnetic core 26 is circumscribed along one side by a coil 28 to form an electromagnet. As best seen in FIG. 3, the core 26 features pole faces 26a and 26b, between which is defined the operative gap of the electromagnet. A pair of alignment lugs 30 and 32 are positioned over the pole faces 26a and 26b, respectively. Each alignment lug 30 and 32 is selectively positioned relative to the core 26, and held in place by one or more set screws 34 (two are shown holding each lug). Details of the construction and function of the alignment lugs 30 and 32 will be described hereinafter.

The lumen unit 14 is shown in FIGS. 2 and 3 within the magnet operative gap. Details of the construction of the lumen unit 14 may be appreciated by reference to FIGS. 2-8. In addition to the flow line receptacles 20 and 22, the lumen unit includes a central portion generally in the shape of a rectangular parallelepiped 36 bounded by shoulder units 38 and 40 adjacent the flow line receptacles 20 and 22, respectively. Each shoulder unit 38 and 40 protrudes laterally beyond the rectangular parallelepiped section 36 in three directions defining the top 14a, the bottom 14b, and the back 14c of the lumen unit. On the remaining lumen unit front side 14d, the shoulder units 38 and 40 do not extend beyond the rectangular parallelepiped section 36. A stop plate 42 is flanged along its ends to mesh with the shoulder units 38 and 40 along the lumen unit back 14c to facilitate a secure fit. The stop plate 42 is bonded in place. As may be appreciated particularly by reference to FIGS. 4–6, the stop plate 42 cooperates with the shoulder units 38 and 40 to form rectangular parallelepiped recesses 14e and 14f on the lumen unit top 14a and bottom 14b, respectively. The lumen unit recesses 14e and 14f receive the alignment lugs 30 and 32, respectively, as will be described in more detail hereinafter, when the lumen unit 14 is positioned within the magnet operative gap.

The lumen unit 14 features a lumen, or passageway, 44 extending the length of the lumen unit, and passing through both flow line receptacles 20 and 22 as well as the central rectangular parallelpiped section 36. The lumen 44 is a smooth-walled conduit of uniform cross section through which the fluid whose flow is to be monitored passes. Thus, the fluid passing between the tubular members 16 and 18 is conducted through the operative gap along the lumen 44 when the lumen unit 14 is in position as shown in FIGS. 1–3. To facilitate a fluid-tight connection between each flow line receptacle and a corresponding tubular member, the flow line receptacles 20 and 22 may be constructed with frustoconical shoulders, as shown, over which the resilient members may be stretched. Also, a clamp or other appropriate mechanism (not shown) may be applied to maintain each tubular member anchored and sealed to one of the flow line receptacles.

It will be appreciated that the lumen unit 14, as thus far described, is made of non-magnetic materials. Various plastics, such as styrene and epoxy, may typically be used for this purpose. While the particular material and method of manufacture of the lumen unit 14 do not limit the present invention, a particular mode of construction of such a lumen unit is described hereinafter to facilitate an understanding of the arrangement of its elements.

Figure 5:
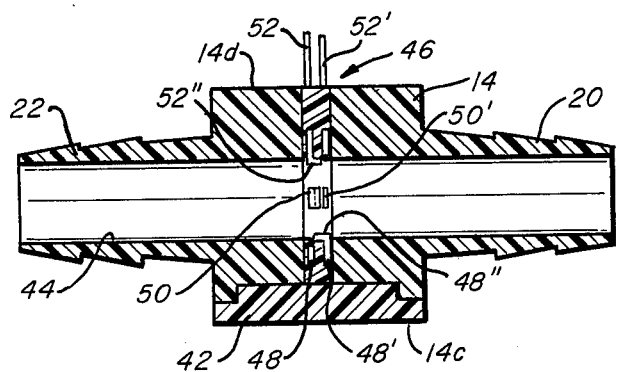
FIG. 5 is a bottom longitudinal cross section of the lumen unit taken along the line 5—5 in FIG. 4.
Figure 6:
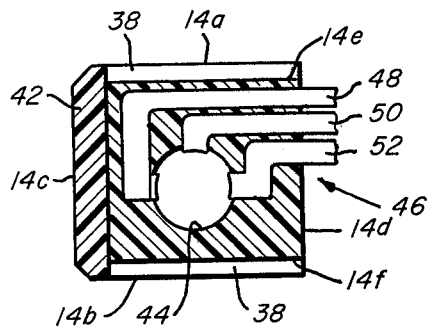
FIG. 6 is a transverse cross section of the lumen unit taken along the line 6—6 in FIG. 4.
Figure 7:
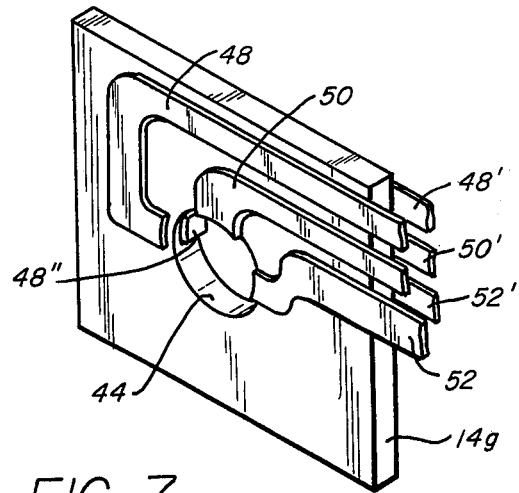
FIG. 7 is an enlarged perspective view showing the electrode and lead assembly of the lumen unit.

The lumen unit 14 includes an electrode and lead assembly, shown not to scale at 46 in FIGS. 5-7. The electrode and lead assembly at 46 may be constructed on a non-magnetic substrate lamina 14g, shaped as shown in FIG. 7. Any appropriate method may be used to construct the electrodes and leads of conducting material. By way of example rather than limitation, such methods include various plating processes, evaporation techniques, and shaping the components from foil or other stock. Whichever method is used, three pairs of leads are formed. Thus, on one side of the substrate 14g as seen in FIG. 7, planar leads 48, 50, and 52 are formed. On the other side of the substrate 14g, planar leads 48', 50', and 52' are constructed to generally parallel the set of leads 48, 50, and 52, respectively. Thus, the lead 48 extends from a position adjacent the extension of the lumen 44 through the substrate 14g, toward the top of the substrate, and ends in a protrusion beyond the front end of the substrate. The paralleling lead 48' follows generally the same path, on the other side of the substrate 14g. Similarly, leads 52 and 52' extend from positions, on their respective sides of the substrate 14g, at generally 180° around the lumen 44 from the ends of the leads 48 and 48', and also end in protrusions beyond the front of the substrate. Parallel leads 50 and 50' similarly extend, on their respective sides of the substrate 14g, from circumferential positions about the lumen 44 at a location midway between the positions of the ends of the lead pairs 48, 48' and 52, 52', and also end in protrusions extending beyond the front of the substrate. As may best be seen in FIG. 5, both leads 50 and 50' extend generally evenly with the interior wall defining the lumen 44. Each of the leads 48' and 52 also extend to the interior of the lumen 44, ending there in electrodes 48" and 52", respectively. When the lumen unit 14 is assembled, the electrodes 48" and 50", and the ends of the leads 50 and 52', are exposed to the fluid flow within the lumen 44, but the leads 48 and 52' are insulated therefrom. The electrodes 48" and 52" are in the form of rectangles, curved to fit the shape of the lumen 44, and proportioned approximately three times as wide circumferentially as the length of the electrodes parallel to the axis of cylindrical symmetry of the lumen 44. The purpose of the shape of electrodes 48" and 52" will be discussed hereinafter, as will be the reason for the leads 48 and 52' stopping short of the lumen 44.

Figure 4:
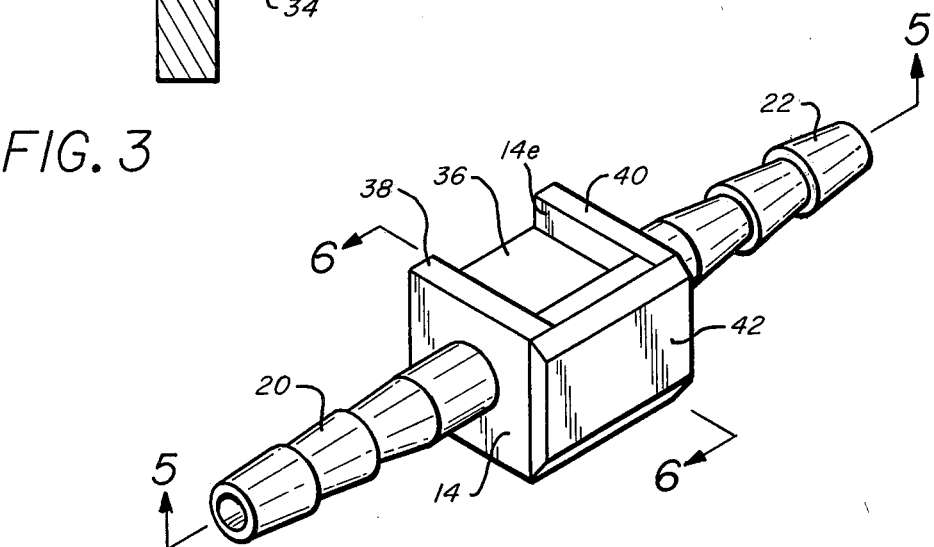
FIG. 4 is a perspective view of the lumen unit.
Figure 8:
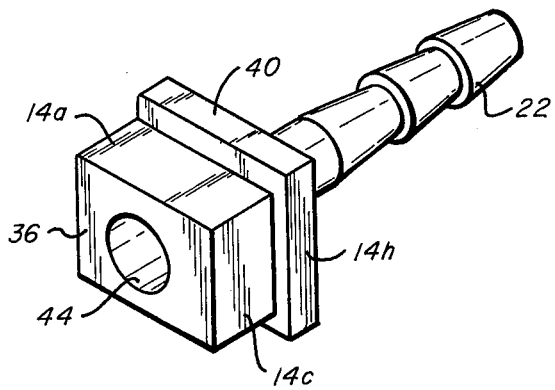
FIG. 8 is a perspective view of a portion of the lumen unit.

The lumen units 14 may be formed by bonding the substrate 14g, with the electrode and lead assembly 46 constructed as described hereinbefore, between a lumen "half section" 14h shown in FIG. 8, and a similar lumen "half section" (not shown) which is a mirror image of the section 14h. Thus, the combination of the substrate 14g, with the electrode and lead assembly 46 in place, with the two lumen "half sections" may be formed as indicated in FIGS. 4-6. The ends of the leads 48 and 52' may be insulated from contact with fluid in the lumen 44 by the bonding material. Then, the portions of the electrodes 48-52, and 48'-52' which extend beyond the edge of the substrate 14g are positioned to protrude from the front surface 14d of the lumen unit 14, thus constituting a six-element male connector device.

While the substrate 14g and the two lumen "half sections" may be formed in any convenient manner, including machining from stock, it is advantageous to construct these elements by molding. It will be appreciated that, when the lumen unit 14 is bonded together, the lumen 44 is formed by the cooperation of the aforementioned three lumen unit elements. Finally, the stop plate 42 is bonded in place as discussed hereinbefore. It will be appreciated that the stop plate 42 may also be formed as integral parts of the the individual lumen elements, that is, the substrate 14g and the two "half sections."

The electrode and lead assembly 46 may be constructed from any electrically conducting material. However, the selection of material may be related to the manner in which the electrode and lead assembly at 46 is manufactured. Another consideration in selecting the material for the construction of the electrode and lead assembly at 46 is the choice of material that is not only a good electrical conductor but also that exhibits a low rate of oxidation. Since the electrodes 48" and 52", as well as the ends of the leads 50 and 50', are exposed within the lumen 44 to the fluid whose flow is being monitored, the surfaces of the electrodes and leads must be kept as clear of contamination as possible. This is true not only to prevent pollution of the fluid being conducted through the lumen 44, but also to insure proper electrical contact between the fluid and the aformentioned electrodes and leads.

Figure 9:
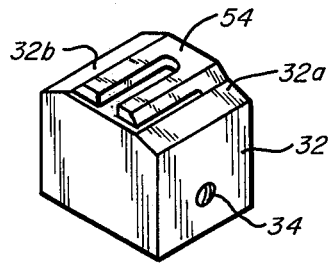
FIG. 9 is a perspective view of an alignment lug.

Details of the lower alignment lug 32 may be appreciated by reference to FIG. 9 in conjunction with FIG. 3. The alignment lug 32 is in the form of a casing open at one end, and which may fit loosely over the pole face 26b. Set screws 34 lock the alignment lug 32 to the core 26 of the magnet structure at any desired position over a range of positions limited generally by the relative dimensions of the interior of the lug 32 and the core 26 adjacent the pole face 26b. Thus, the alignment lug 32 may be moved along three mutually orthogonal degrees of freedom relative to the pole face 26b, and held in a selected position by appropriate manipulation of the set screws 34 against the core 26.

A U-shaped spring member 54 is positioned atop the alignment lug 32, with the base of the U generally fixed to the lug and the two arms of the U positioned, relaxed, just above the lug surface. The two arms of the U spring member 54 are relatively free to be moved generally toward and away from the alignment lug 32.

The other alignment lug 30 may be identical to the alignment lug 32 described herein, and oriented to be positioned over the pole face 26a as indicated in FIGS. 2 and 3. Thus, with the two alignment lugs 30 and 32 in position over their respective pole faces 26a and 26b, the spring members 54 face each other, with their bases positioned generally toward the coil 28 of the magnet structure, and the arms of the U-shaped spring members pointing generally away from the coil.

Alongside the spring members 54 on both alignment lugs 30 and 32, the surfaces of the alignment lugs are beveled, as at 32a and 32b in FIG. 9. The lumen unit 14 is joined to the magnet structure by moving the lumen unit between the positioned alignment lugs 30 and 32 so that the spring members 54 are received by the recesses 14e and 14f, respectively, and lie against the stop plate 42. Thus, at the top and bottom of the lumen unit, respectively, positioning of the alignment lugs 30 and 32 causes the lumen unit 14 to be mated with the magnet structure in such a way as to appropriately align the longitudinal axis of the lumen 44 to be perpendicular to the magnetic field produced within the magnet operative gap. Furthermore, the orientations of the electrodes 48″ and 52″, along with the ends of the leads 50 and 50′ at the lumen 44, are such that the aforementioned electrodes and lead endings lie generally along a plane perpendicular to the longitudinal axis of the lumen 44. Therefore, when the lumen unit 14 is positioned within the magnet operative gap as described hereinbefore, the plane of the aforementioned electrodes and lead endings is parallel to the direction of the magnetic field that may be produced within the operative gap. Finally, when the lumen unit is so positioned within the magnet operative gap, a straight line joining the centers of the electrodes 48″ and 52″ will not only be perpendicular to the longitudinal axis of the lumen 44, but will also be perpendicular to the magnetic field that may be produced within the magnet operative gap. It will be appreciated, then, that this straight line joining the two electrodes 48″ and 52″ may be a perpendicular bisector of the straight line joining the centers of the two pole faces 26a and 26b.

In practice, the pole faces 26a and 26b may not be perfectly mutually aligned. Furthermore, the desired positioning of the alignment lugs 30 and 32, as described in more detail hereinafter, may be such that the alignment lugs may also not be perfectly mutually aligned. Then, even though the alignment lugs may be mutually laterally displaced and misaligned, the beveled surface feature of the alignment lugs, adjacent the legs of the spring members 54, such as at 32a and 32b, provides the necessary space for the lumen unit 14 to be received by the alignment lugs 30 and 32 and oriented within the magnet operative gap.

It will be appreciated that the alignment lugs, including their spring members 54, are also made from non-magnetic material. Preferably, the body of the alignment lugs 30 and 32, as well as the spring members 54, may be made from resilient material. Then, a relatively tight fit may be achieved between the alignment lugs 30 and 32 and any lumen unit 14 positioned therebetween to the end that the lumen unit is held firmly in place and may not be easily dislodged by inadvertent bumping or vibration.

A continuation of the electrode lead system, connectible to the electrode and lead assembly 46 when the lumen unit 14 is positioned within the magnet operative gap, is indicated in FIG. 2. A six-element female connector device 56 is held within a magnetic shield 58. The magnetic shield 58 may be fixed within the magnet structure casing 12, as discussed hereinbefore. The female connecting device 56 is positioned to receive the six-element male connecting device formed by the protrusions of the leads 48–52, and 48′–52′ beyond the front of the lumen unit 14 as described hereinbefore. A shielded and grounded cable 60 contains leads from the female connecting device 56 and extends through the magnetic shield 58, to which the cable shielding is also connected, and passes through the magnet structure casing 12. Similarly, appropriate leads 62 extend from the coil 28 to which they are electrically connected. The leads 62 from the coil 28 and the shielded cable 60 may be combined within the cable 24 indicated in FIGS. 1 and 2, which then extends to external circuitry required to operate the electromagnetic flow probe.

Figure 13:
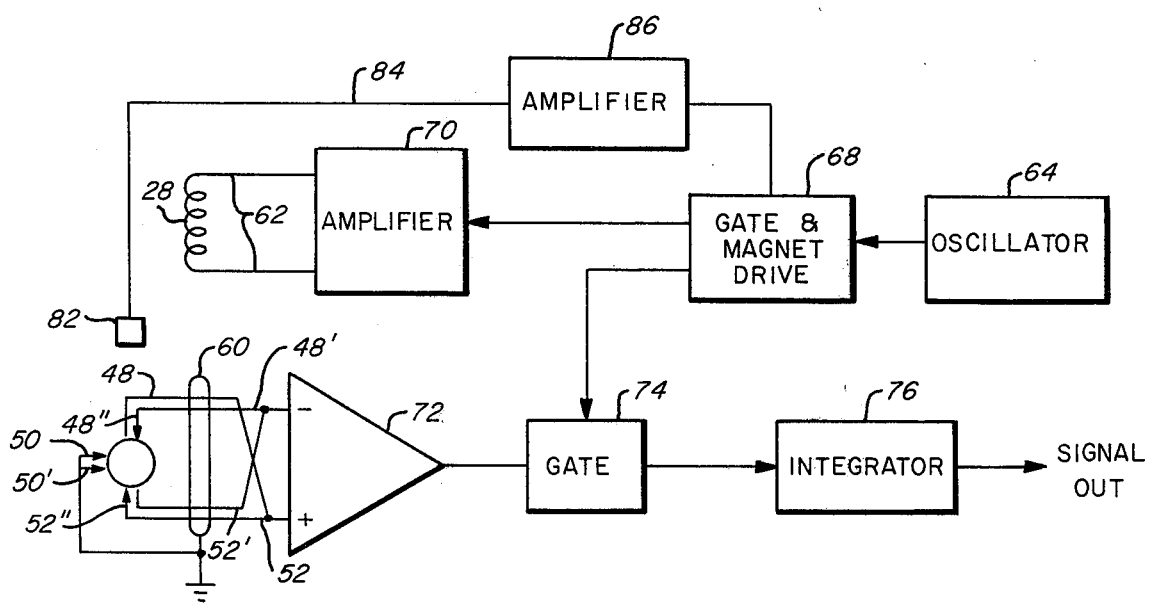
FIG. 13 is a schematic diagram of the flow probe electrical circuit and of related magnet driving and signal processing circuitry.

FIG. 13 schematically illustrates such circuitry which may be used to operate the electromagnetic flow probe, along with the arrangement of the electrode and lead assembly 46. An oscillator 64 is used to generate a constant frequency signal, which is then gated by a gate and magnet drive 68. The result is a signal emerging from the gate and magnet drive 68, and amplified by the amplifier 70, in the general form of a square wave. The amplified square wave signal is fed, by way of the leads 62, to the electromagnet coil 28, to produce a magnetic field across the operative gap between the pole faces 26a and 26b which varies with time, at any given point within the operative gap, generally as a square wave.

The electrodes 48″ and 52″, along with the leads 48–52, and 48′–52′, are arranged about the lumen 44 as illustrated, and joined, by way of the shielded cable 60, to a differential amplifier 72. The two leads 50 and 50″', both of which are exposed to the fluid to be monitored within the lumen 44, are ultimately connected together and to ground of data processing circuitry described hereinafter, as is the shielding of the cable 60. Thus, the ground leads 50 and 50′ determine the plane, perpendicular to the line joining the two electrodes 48″ and 52″ and midway therebetween, as ground in common with the ground of data processing circuitry. The lead 52 connects the electrode 52″ to one input of the differential amplifier 72, say, the non-inverting input. Similarly, the lead 48′ connects the electrode 48″ to the other input of the differential amplifier 72. Since the leads 48 and 52 connect electrodes to the external circuitry input, they may be referred to as primary leads. The leads 48 and 52′, which end without making contact with the fluid within the lumen 44, run parallel to the leads 48 and 52, respectively, within the magnet operative gap when the lumen unit 14 is positioned therein, as noted hereinbefore. However, these leads 48′ and 52, which may be referred to as secondary leads, are then connected ultimately to the differential amplifier 72 as follows: secondary lead 48 is connected to the same input as primary lead 52; and secondary lead 52′ is connected to the same input as primary lead 48′. Thus, while the similarly numbered leads are positioned mutually parallel within the magnet operative gap, they are asymmetrically connected, in a crossover arrangement, to the input terminals of the external data processing circuitry The output of the differential amplifier 72 is fed to a gate 74 before passing on to an integrator 76 and subsequent signal processing circuitry (not shown). The gate 74 is enabled periodically by a signal from the gate and magnet drive 68. Thus, although, in general, signals may be acquired from the electrode and lead assembly 46 through the differential amplifier 72 on a continuing basis, data is passed on from the gate 74 on a periodic basis, with the period of data acquisition coinciding with the period of the square wave signal operating the electromagnet coil 28. The gate 74 is slectively enabled to pass such data from the differential amplifier 72 that is acquired by the electrode and lead assembly 46 during a non-zero level portion of the square wave driving the electromagnet. Thus, the magnetic field is held constant in time while the electric potential difference across the lumen 44 is being measured by way of the electrode and led assembly 46, with a data signal passed on by the gate 74.

Figure 10:
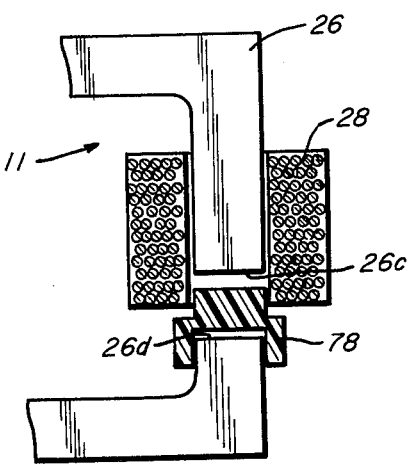
FIG. 10 is a partial sectional view of the magnet structure equipped with the adjustable keeper.

The magnet structure may be equipped with a magnetic field adjustment means to insure the production of a magnetic field within the magnet operative gap according to desired parameters. Such an ajustment means is illustrated in FIGS. 2 and 10. The core 26 exhibits an air gap, or adjustment gap, identified by the location of the core gap faces 26c and 26d. The adjustment gap may be maintained by rigidly fixing the core segments by attachment to the interior of the magnet structure casing 12, as discussed hereinbefore. Thus, the distance between the adjustment gap faces 26c and 26d, as well as the mutual alignment therebetween, may be held constant. An adjustment keeper 78 is selectively positioned within the adjustment gap, and held in place by one or more set screws 80 tightened against the core 26. The adjustment keeper 78 is in the form of a block continuing as a casing open at one end, and which may pass over the gap face 26d. It will be clear from FIG. 10 that the adjustment keeper 78 may be placed at any position along its longitudinal axis within the adjustment gap, limited only by the adjustment gap faces 26c and 26d.

It will be appreciated that, for a given value of driving signal passing through the winding 28, the flux density within the magnet operative gap may be changed by moving the adjustment keeper 78 within the adjustment gap. The path for the magnetic flux between the adjustment keeper 78 and the core 26 in the vicinity of the lower adjustment gap face 26d, about which the adjustment keeper is positioned, has less reluctance than the path between the adjustment keeper 78 and the core in the vicinity of the upper adjustment gap face 26c due to the overlap of the core by the adjustment keeper at the lower gap face. As the adjustment keeper 78 is moved toward the upper adjustment gap face 26c, while still enclosing the lower adjustment gap face 26d, the reluctance of the path between the core and the adjustment keeper at the lower gap face experiences relatively little change, while the reluctance along the path between the adjustment keeper and the core at the upper gap face decreases due to the lessening of the spacing between the gap face 26c and the adjustment keeper. Thus, by moving the adjustment keeper 78 up or down within the adjustment gap between the adjustment gap faces 26c and 26d, the total reluctance about the core 26 and across the adjustment gap as well as the magnet operative gap is decreased or increased, respectively. Consequently, for a given value of driving signal in the winding 28, the magnetic field strength at any point within the magnet operative gap may be increased or decreased by moving the adjustment keeper 78 upwardly or downwardly, respectively, as viewed in FIGS. 2 and 10. It will be appreciated that, as the reluctance of the magnetic circuit about the core 26 is thus varied, the shape of the magnetic field about the magnet operative gap, for a given value of driving signal in the winding 28, may, in general, also be varied, particularly toward the lateral periphery of the operative gap.

Figure 11:
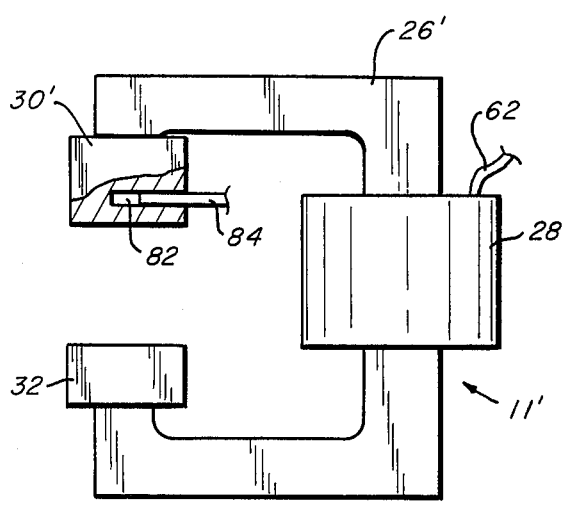
FIG. 11 is a schematic view of the flow probe magnet structure, with the casing removed, illustrating the incorporation of a Hall probe in an alignment lug, shown partially broken away.

In FIG. 11 another embodiment of magnetic field adjustment means is indicated. One of the adjustment lugs, for example, the upper one 30, is varied, indicated as 30', to include embedded therein a Hall probe 82, with appropriate connecting cable 84. The Hall probe is indicated in FIG. 13 sending an output signal through an amplifier 86 to the gate and magnet drive unit 68. The Hall probe 82 may thus be used in the manner of a feedback device to control the magnetic field within the magnet operative gap. Thus, the Hall probe senses the magnetic field strength, and signals the gate and magnet drive 68 if the field strength is larger or smaller than a predetermined value. The gate and magnet drive 68 then alters the amplitude of the signal used to operate the electromagnet through the winding 28 to either increase or decrease the magnetic field maximum strength to maintain that predetermined value. It will be appreciated that the Hall probe 82 may be positioned in either alignment lug 30' or 32, or may be located elsewhere in the vicinity of the magnet operative gap. Where the adjustable keeper 78 of FIGS. 2 and 10 is used with the adjustment gap as a means of magnetic field adjustment, the Hall probe 82, along with the related cable 84 and amplifier 86, need not be included in the apparatus. A magnet core 26' without an adjustment gap may be used with the Hall probe, as shown in FIG. 11.

Figure 12:
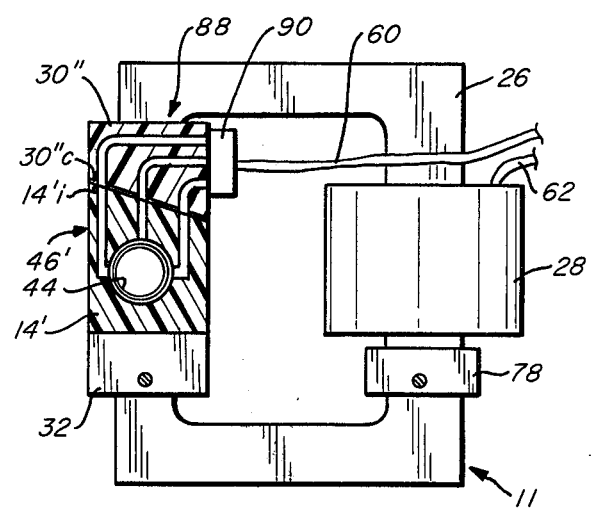
FIG. 12 is a schematic view, in partial section, of the flow probe, with the magnet structure casing removed, illustrating an alternate method for continuing the electrical leads from the lumen unit.

FIG. 12 illustrates an alternative for connecting the electrode and lead assembly 46 to the extension of the lead system in the shielded cable 60. In this case, an adjustment lug 30" includes a beveled segment 32"c, between the arms of the U-shaped spring member 54. An oppositely beveled, matching surface segment 14'i is included within the upper recess surface of a lumen unit 14' such that when the lumen unit is positioned within the magnet operative gap, the beveled surfaces 32"c and 14'i make mutual contact as indicated in FIG. 12. An electrode and lead assembly 46' extends from the vicinity of the lumen 44 as previously discussed in connection with the electrode and lead assembly 46, but is directed toward the beveled surface 14'i at the top of the lumen unit 14' rather than toward the front of the lumen unit. At the beveled top surface 14'i of the lumen unit 14', the leads of the electrode and lead assembly 46' are exposed. Embedded within the alignment lug 30", is a six-member lead system 88, including three pairs of parallel leads arranged as indicated in FIG. 12, and exposed along the beveled surface of the alignment lug 30". Thus, when the lumen unit 14' is positioned between the alignment lugs 30" and 32 as indicated in FIG. 12, the six leads of the electrode and lead assembly 46' make electrical contact, on a one-to-one basis, with the six lead members of the lead system 88 within the alignment lug 30". The lead system 88 is connected to the shielded cable 60 at the magnetically shielded connector 90. The connector 90 may be any type of electrical connection device, including, but not limited to, male-female connectors. Thus the individual leads of the lead assembly 88 may be permanently joined to elements within the shielded cable 60, or may even be integral extensions thereof.

Apparatus of the present invention provides an electromagnetic flow probe with separate magnet structure and lumen unit, wherein such components are interchangeable with like magnet structures and lumen units, respectively, of the present invention without loss of accuracy and reliability of performance of the apparatus, and without the need for recalibration and/or adjustment of the apparatus components upon such interchange. Thus, a given magnet structure of the present invention may be used repeatedly with different lumen units of the present invention, with each lumen unit discarded, if necessary, after its use. Similarly, a given lumen unit of the present invention may be installed in line with tubular flow members on a permanent or semipermanent basis, and one or another magnet structures of the present invention engaged with that lumen unit whenever it is desired to monitor fluid flow therethrough.

To carry out the aforementioned interchange of component parts of the flow probe of the present invention without recalibration and/or adjustment, both the magnet structures and the lumen units require certain uniformity to expose the fluid flow to be monitored to essentially the same magnetic field conditions, and the same potential difference measuring characteristics. Thus, the positioning of the electrodes and ground leads at the lumen must be generally consistent in all lumen units of the present invention. The magnetic field adjustment means, whether of the adjustment keeper or the Hall probe design, enables all magnet structures of the present invention to be appropriately adjusted to provide uniformity of magnetic field characteristics, within the magnet operative gaps. Similarly, the alignment lugs for each magnet structure may be selectively positioned so that they will receive all like lumen units of the present invention to expose the lumen therein, at the location of the electrode and ground leads, to the same magnetic field characteristics as in the case for all other magnet structures.

The use of the particular embodiment of lumen unit of the present invention, whether of the design of FIGS. 2-7 or of FIG. 12, is related to the selection of alignment lug, whether of the type 30 or 30". It will be appreciated that the Hall probe 82 may be incorporated within the alignment lug 30" of FIG. 12, or may be used in conjunction with the latter alignment lug as a feature of the alignment lug encompassing the opposite pole face, in place, for example, of the lower alignment lug 32 in FIG. 12. Also, the Hall probe of FIG. 11, along with related circuity shown in FIG. 13, may be employed with a magnet featuring the adjustment keeper 78 of FIGS. 2 and 10. Then, the two magnetic adjustment means may be used alternately as desired, or together, wherein the Hall probe may be used in response to changed conditions concerning the magnet structure, or as a refinement or backup adjustment device. Both adjustment means may also be used to compensate for drift or inaccuracy of the drive signal to the magnet.

The system of parallel primary and secondary electrode leads of the present invention, including the asymmetrical, or crossover, connection of the secondary leads to the primary lead inputs to the differential amplifier 72, minimizes the quadrature, or transformer, effect on the electrode and lead assembly in the vicinity of the operative gap of the magnet structure. Each of the two primary leads, 48' and 52, may carry a signal comprising a data component related to the electric potential difference across the fluid flow in the lumen 44, and an induced guadrature component, which may be considerably larger than the data component. The secondary lead paralleling each primary lead carries an induced quadrature signal without a data component. Thus, the quadrature signal carried by the primary lead 48' is virtually identical to that carried by its parallel secondary lead, 48. Similarly, the quadrature signal carried by the primary lead 52 is virtually identical to that carried by its parallel secondary lead 52'. However, the two quadrature signals coming from opposite sides of the lumen 44 are virtually equal in magnitude, shape and frequency, but are 180° out of phase. By combining the quadrature signal carried by the secondary lead 48 with the signal carried by the primary lead 52 from the electrode on the opposite side of the lumen 44, and similarly combining the quadrature signal carried by the secondary lead 52' with the signal carried by the primary lead 48', the differential amplifier 72 is presented with input signals with components as follows: the asymmetrically combined quadrature components appearing as a common mode voltage signal at each input; and the normal mode fluid-flow related potential difference signal across the two inputs. The differential amplifier 72 then cancels out the quadrature components while amplifying the data signal components for transmission onto gate 74. In this way, the induced quadrature effect on the electrodes within the operative gap of the magnet structure is negated.

It will be appreciated that the quadrature effect occurs primarily within the operative gap of the magnet structure. Beyond the operative gap, the shielding of cables 60 and 24, along with the shielding of devices 58 or 90 prevent further induced signals on the lead system. Further, the bundling of the wiring out of the operative gap exposes the wires to the same fields and thus ensures that any induced spurious potential is common mode.

The system of parallel, asymmetrically joined primary and secondary leads also negates the imbalance effect due to the different capacitances between the individual leads and the lead line 62 and coil 28 of the electromagnet. Thus, the net capacitance difference between the primary leads and the electromagnet wiring system is reduced to zero by the crossover connections of the secondary leads to the primary lead input to the differential amplifier 72.

The shapes of the electrodes 48" and 52" are also designed to reduce the effect of eddy currents in the fluid flowing along the lumen 44. Thus, the approximately 3:1 ratio between the sides of each such electrode, with the longer sides generally along the induced magnetic field within the operative gap, allows a sufficiently large area for the electrodes such that minor variations in the areas of the two electrodes within a given lumen unit constitute insignificantly small percentage differences in the areas. At the same time, the extension of each electrode along the direction of flow of the fluid, and, therefore, along the direction of eddy currents induced within the flowing fluid, is minimized. In this way, any possible polarization of the electrodes due to the eddy currents induced within the fluid flowing through the magnetic field is reduced, as noted in U.S. Pat. No. 3,329,018.

It will be appreciated that the present invention may employ magnet structures of various designs. By way of example rather than limitation the magnet structure may include two straight core electromagnets in line across an operative gap. Also, the Hall probe magnetic adjustment means may be used with an air core electromagnet rather than the solid core electromagnet described herein. Additionally, although a generally square wave drive signal is described for operating the electromagnet herein, the present invention may be used with virtually any type magnet driving signal, although a square wave includes a level signal segment during which data may be acquired and processed through the electrode and lead system while the magnetic field within the operative gap is held constant. If such constant magnet field segments are not used, the induced quadrature signal components on the individual leads are increased, although, with the present invention, these quadrature signals would nevertheless be cancelled by operation of the differential amplifier 72. Similarly, a d.c. electromagnet driving signal may be used, or even a permanent magnet may be employed, according to the present invention.

Additional variations may be made in the electrode and lead system according to the present invention. For example, a pair of ground electrodes may be positioned symmetrically about the active electrodes, with the ground electrodes positioned along the lumen to either axial side of the active electrodes.

The foregoing disclosure and description of the invention is illustrative and explanatory thereof, and various changes in the sizes, shapes and materials as well as in the details of the illustrated constructions may be made within the scope of the appended claims without departing for the spirit of the invention.

We claim:

1. Apparatus for measuring fluid flow comprising:
   (a) magnetic field production means, including means defining an operative gap, for producing a magnetic field within said operative gap with said magnetic field oriented generally along a first direction;
   (b) housing means, including passage means for conducting said fluid flow through said housing means, selectively receivable by, and selectively positionable relative to, said magnetic field production means for conducting said fluid flow through said operative gap along a second direction;
   (c) electrode and lead means, within said housing means, for detecting electric potential induced, within said operative gap, across the flow of fluid along a third direction; and
   (d) alignment means, including selectively adjustable lug means, for holding, and selectively limiting the positionability of, said housing means relative to said magnetic field production means to effect alignment of said fluid flow within said operative gap along said second line, and to effect orientation of said electrode means for said detecting along said third line, when said housing means is so received by said magnetic field production means.

2. Apparatus for measuring fluid flow as defined in claim 1 wherein said alignment means further includes spring means whereby said housing means may be generally firmly held relative to said magnetic field production means.

3. Apparatus for measuring fluid flow as defined in claim 2 wherein said lug means includes beveled surface means for accomodating displacement of said lug means when said lug means so holds said housing means.

4. Apparatus for measuring fluid flow as defined in claim 3 further comprising:
   (a) primary lead means, as part of said electrode and lead means, for communicating data signals in response to the detection of said induced electric potential from the vicinity of said operative gap; and
   (b) secondary lead means, as part of said electrode and lead means, for paralleling, at least within said operative gap, said primary lead means, for reducing extraneous electric and magnetic field effects on said data signals carried by said primary lead means.

5. Apparatus for measuring fluid flow as defined in claim 4 wherein said electrode and lead means further includes:
   (a) a first electrode for communicating with fluid within said passage means at a first position along said passage means;
   (b) a second electrode for communicating with fluid within said passage means at a second position along said passage means, wherein said first and second positions lie along said third direction;
   (c) a first primary lead means for communicating between said first electrode and a first input to data processing means;
   (d) a second primary lead means for communicating between said second electrode and a second input to said data processing means;
   (e) a first secondary lead means generally paralleling said first primary lead means within said operative gap, but not communicating with said fluid within said passage means, and communicating with said second input; and
   (f) a second secondary lead means generally paralleling said second primary lead means within said operative gap, but not communicating with said fluid within said passage means, and communicating with said first input.

6. Apparatus for measuring fluid flow as defined in claim 5 wherein said electrode and lead means further includes first and second ground lead means, for communicating with said fluid within said passage means at a location within said passage means generally along a plane perpendicular to said third direction and midway between said first and second positions.

7. Apparatus for measuring fluid flow as defined in claim 6 wherein said magnetic field production means further includes electromagnet means for use with drive circuit means for generating electric current in said electromagnet means to so produce said magnetic field.

8. Apparatus for measuring fluid flow as defined in claim 7 wherein said adjustment means includes Hall probe means for obtaining a measure of said magnetic field, and communicating a signal, corresponding to said measure, to said drive circuit means whereby said drive circuit means may respond to said signal from said Hall probe to maintain said magnetic field according to predetermined parameters.

9. Apparatus for measuring fluid flow as defined in claim 7 wherein said electromagnetic means includes magnetic core means.

10. Apparatus for measuring fluid flow as defined in claim 9 wherein said adjustment means includes adjustment gap means in said core means and keeper means, selectively positionable within said adjustment gap means for selectively varying magnetic reluctance of said magnetic field production means to so selectively alter said magnetic field within said operative gap.

11. Apparatus for measuring fluid flow as defined in claim 1 wherein said magnetic field production means further includes electromagnet means for use with drive circuit means for generating electric current in said electromagnet means to so produce said magnetic field.

12. Apparatus for measuring fluid flow as defined in claim 11 further comprising Hall probe means for obtaining a measure of said magnetic field, and communicating a signal, corresponding to said measure, to said drive circuit means whereby said drive circuit means may respond to said signal from said Hall probe means to maintain said magnetic field according to predetermined parameters.

13. Apparatus for measuring fluid flow as defined in claim 11 wherein said electromagnetic means includes magnetic core means with adjustment gap means and keeper means, selectively positionable within said adjustment gap means for selectively altering said magnetic field within said operative gap.

14. Apparatus for measuring fluid flow as defined in claim 1 further comprising adjustment means for selectively altering the magnetic field so produced within said operative gap.

15. Apparatus for measuring fluid flow as defined in claim 14 wherein said adjustment means includes selectively positionable keeper means for selectively varying magnetic reluctance of said magnetic field within said operative gap.

16. Apparatus for measuring fluid flow comprising:
(a) magnetic field production means, including means defining an operative gap, for producing a magnetic field within said operative gap with said magnetic field oriented generally along a first direction;
(b) housing means, including passage means for conducting said fluid flow through said housing means, selectively receivably by, and selectively positionable relative to, said magnetic field production means for conducting said fluid flow through said operative gap along a second direction;
(c) electrode and lead means, within said housing means, for detecting electric potential induced, within said operative gap, across the flow of fluid along a third direction;
(d) primary lead means, as part of said electrode and lead means, for communicating data signals in response to the detection of said induced electric potential from the vicinity of said operative gap;
(e) secondary lead means, as part of said electrode and lead means, for paralleling, at least within said operative gap, said primary lead means, for reducing extraneous electric and magnetic field effects on said data signals carried by said primary lead means; and
(f) wherein said electrode and lead means further includes:
 i. a first electrode for communicating with fluid within said passage means at a first position along said passage means;
 ii. a second electrode for communicating with fluid within said passage means at a second position along said passage means, wherein said first and second positions lie along said third direction;
 iii. a first primary lead means for communicating between said first electrode and a first input to data processing means;
 iv. a second primary lead means for communicating between said second electrode and a second input to said data processing means;
 v. a first secondary lead means generally paralleling said first primary lead means within said operative gap, but not communicating with said fluid within said passage means, and communicating with said second input; and
 vi. a second secondary lead means generally paralleling alleling said second primary lead means within said operative gap, but not communicating with said fluid within said passage means, and communicating with said first input.

17. Apparatus for measuring fluid flow as defined in claim 16 wherein said electrode and lead means further includes first and second ground lead means, for communicating with said fluid within said passage means at a location within said passage means generally along a plane perpendicular to said third direction and midway between said first and second positions.

18. Apparatus for measuring fluid flow as defined in claim 17 wherein said magnetic field production means further includes electromagnet means for use with drive circuit means for generating electric current in said electromagnet means to so produce said magnetic field.

19. Apparatus for measuring fluid flow as defined in claim 18 further comprising Hall probe means for obtaining a measure of said magnetic field, and communicating a signal, corresponding to said measure, to said drive circuit means whereby said drive circuit means may respond to said signal from said Wall probe means to maintain said magnetic field according to predetermined parameters.

20. Apparatus for measuring fluid flow as defined in claim 18 wherein said electromagnet means includes magnetic core means with adjustment gap means and keeper means, selectively positionable within said adjustment gap means for selectively altering said magnetic field within said operative gap.

21. Apparatus for measuring fluid flow as defined in claim 17 further comprising alignment means, including selectively adjustable lug means, for holding, and selectively limiting the positionability of, said housing means relative to said magnetic field production means to effect alignment of said fluid flow within said operative gap along said second line, and to effect orientation of said electrode means for said detecting along said third line, when said housing means is so received by said magnetic field production means.

22. Apparatus for measuring fluid flow as defined in claim 21 wherein said alignment means further includes spring means whereby said housing means may be generally firmly held relative to said magnetic field production means.

23. Apparatus for measuring fluid flow as defined in claim 22 wherein said lug means includes beveled surface means for accomodating displacement of said lug means when said lug means so holds said housing means.

24. Apparatus for measuring fluid flow as defined in claim 16 wherein said magnetic field production means further includes means defining an adjustment gap and keeper means, selectively positionable within said adjustment gap means for selectively altering said magnetic field within said operative gap.

25. Apparatus for measuring fluid flow as defined in claim 16 wherein said magnetic field production means further includes electromagnet means for use with drive circuit means for generating electric current in said electromagnet means to so produce said magnetic field.

26. Apparatus for measuring fluid flow as defined in claim 25 further comprising Hall probe means for obtaining a measure of said magnetic field, and communicating a signal, corresponding to said measure, to said drive circuit means whereby said drive circuit means may respond to said signal from said Hall probe means to maintain said magnetic field according to predetermined parameters.

* * * * *